US012670317B2

(12) United States Patent
Tibbetts et al.

(10) Patent No.: US 12,670,317 B2
(45) Date of Patent: Jun. 30, 2026

(54) SYSTEMS, METHODS, AND APPARATUSES FOR IMPLEMENTING A MULTIMEDIA GENERATOR IN AN ELECTRONIC NETWORK

(71) Applicant: BANK OF AMERICA CORPORATION, Charlotte, NC (US)

(72) Inventors: Susan Tibbetts, Ewing, NJ (US); Rizwan Ahsan, Somerset, NJ (US); Carole Booth, Brooklyn, NY (US); Gail Lynne Gross, Pennington, NJ (US); Niteen Kumar Kamalapure, Kendall Park, NJ (US); Daniel Jay Saperstein, Flemington, NJ (US); Sabella Talamasca, Princeton, NJ (US); Vivekanand Pappu, North Caldwell, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 176 days.

(21) Appl. No.: 18/590,377

(22) Filed: Feb. 28, 2024

(65) Prior Publication Data

US 2024/0354496 A1 Oct. 24, 2024

Related U.S. Application Data

(60) Provisional application No. 63/460,122, filed on Apr. 18, 2023.

(51) Int. Cl.
*G06F 40/186* (2020.01)
*G06F 40/134* (2020.01)

(52) U.S. Cl.
CPC .......... *G06F 40/186* (2020.01); *G06F 40/134* (2020.01)

(58) Field of Classification Search
CPC ............................ G06F 40/186; G06F 40/134
(Continued)

(56) References Cited

U.S. PATENT DOCUMENTS 10,283,164 B2 5/2019 Axen
10,523,729 B2 12/2019 Liwerant
(Continued)

FOREIGN PATENT DOCUMENTS

AU 2020213280 A1 8/2020
JP 6967610 B2 11/2021
KR 102127733 B1 6/2020

*Primary Examiner* — Daniel Samwel
(74) *Attorney, Agent, or Firm* — Moore & Van Allen PLLC; Lauren M. Stokes

(57) ABSTRACT

Systems, computer program products, and methods are described herein for implementing a multimedia generator in an electronic network. The present disclosure is configured to generate a template database; receive at least one user input comprising at least one of a selected template of the at least one pre-generated template and an input for at least one fillable component; generate a configured template based on the received at least one user input; transmit the configured template to at least one approval user account; receive at least one approval indication; generate a configured template user interface component to configure a graphical user interface of a user device; transmit the configured template user interface component to the user device; generate a multimedia component based on the configured template user interface component at the user device; and generate a shareable reference to be associated with the multimedia component.

19 Claims, 8 Drawing Sheets

(58) Field of Classification Search
   USPC ................................................ 715/700–866
   See application file for complete search history.

(56)                     References Cited

U.S. PATENT DOCUMENTS

| | | | |
|---|---|---|---|
| 10,764,254 | B2 | 9/2020 | Ford |
| 10,845,968 | B2 | 11/2020 | Scapel |
| 10,983,960 | B2 | 4/2021 | Faith |
| 11,200,243 | B2 | 12/2021 | Venkataraman |
| 11,373,275 | B2 | 6/2022 | Tai |
| 11,438,637 | B2 | 9/2022 | Ni |
| 11,615,131 | B2 | 3/2023 | Imbruce |
| 11,675,836 | B2 | 6/2023 | Maharajh |
| 11,700,416 | B2 | 7/2023 | Liston |
| 11,798,031 | B2 | 10/2023 | Greer |
| 11,849,153 | B2 | 12/2023 | Reznik |
| 2008/0109808 | A1* | 5/2008 | Wing ..................... G06F 16/93<br>718/102 |
| 2009/0144157 | A1* | 6/2009 | Saracino ................ G06Q 30/02<br>726/4 |
| 2010/0010998 | A1* | 1/2010 | Wagner ............... G06F 21/6209<br>707/E17.01 |
| 2010/0153520 | A1* | 6/2010 | Daun ................... G11B 27/034<br>709/218 |
| 2011/0217021 | A1* | 9/2011 | Dubin ...................... H04N 7/15<br>386/278 |
| 2013/0340035 | A1* | 12/2013 | Uziel .................... G06Q 10/06<br>726/1 |
| 2016/0092935 | A1* | 3/2016 | Bradley ........... G06Q 30/0276<br>705/14.72 |
| 2017/0149757 | A1* | 5/2017 | Rutherford .......... H04W 12/06 |
| 2018/0242045 | A1 | 8/2018 | Greenstein |
| 2020/0236220 | A1 | 7/2020 | Lawson |
| 2021/0352371 | A1 | 11/2021 | Ortiz |
| 2022/0179665 | A1 | 6/2022 | Rathod |

* cited by examiner

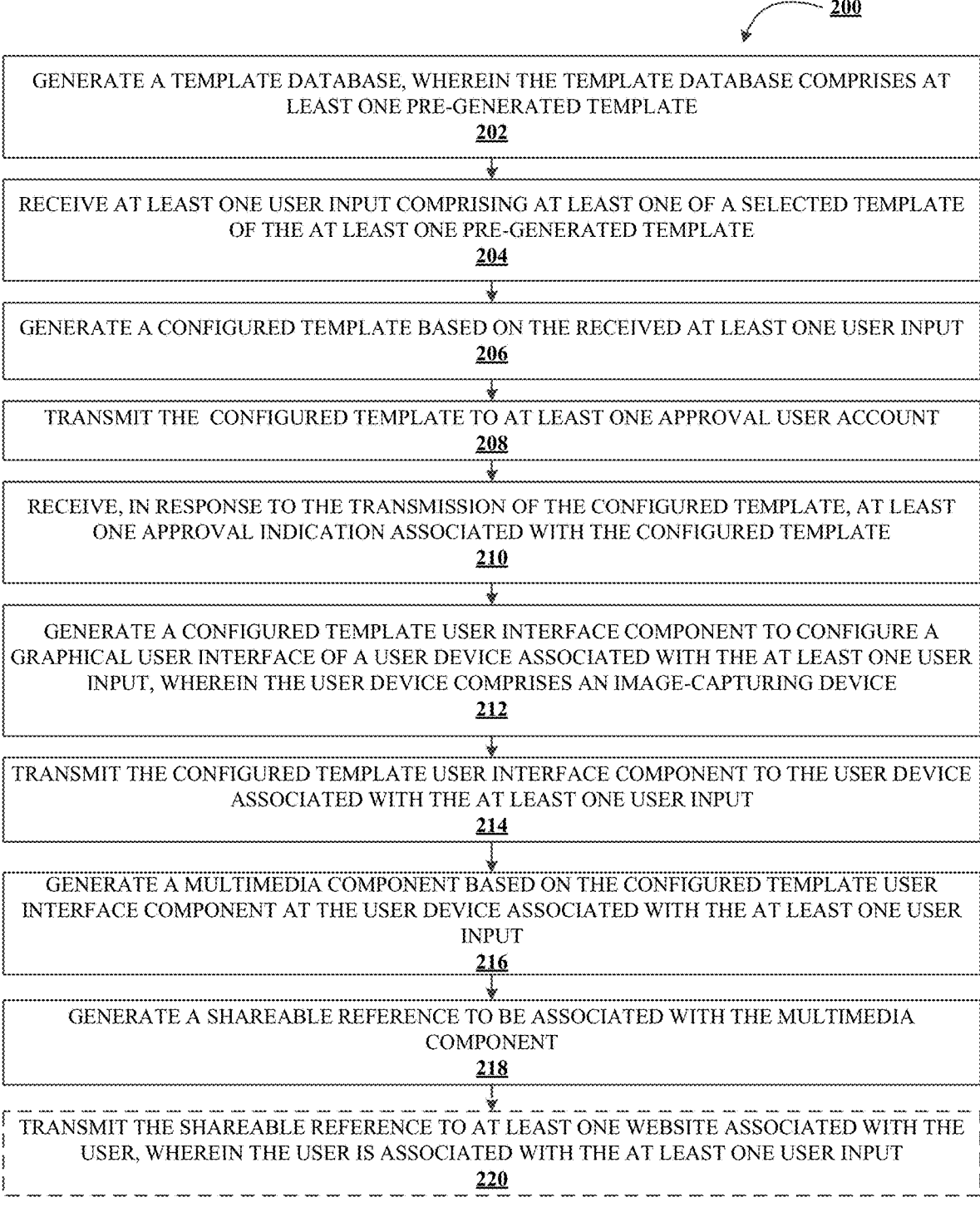

GENERATE A TEMPLATE DATABASE, WHEREIN THE TEMPLATE DATABASE COMPRISES AT
LEAST ONE PRE-GENERATED TEMPLATE
202

RECEIVE AT LEAST ONE USER INPUT COMPRISING AT LEAST ONE OF A SELECTED TEMPLATE
OF THE AT LEAST ONE PRE-GENERATED TEMPLATE
204

GENERATE A CONFIGURED TEMPLATE BASED ON THE RECEIVED AT LEAST ONE USER INPUT
206

TRANSMIT THE  CONFIGURED TEMPLATE TO AT LEAST ONE APPROVAL USER ACCOUNT
208

RECEIVE, IN RESPONSE TO THE TRANSMISSION OF THE CONFIGURED TEMPLATE, AT LEAST
ONE APPROVAL INDICATION ASSOCIATED WITH THE CONFIGURED TEMPLATE
210

GENERATE A CONFIGURED TEMPLATE USER INTERFACE COMPONENT TO CONFIGURE A
GRAPHICAL USER INTERFACE OF A USER DEVICE ASSOCIATED WITH THE AT LEAST ONE USER
INPUT, WHEREIN THE USER DEVICE COMPRISES AN IMAGE-CAPTURING DEVICE
212

TRANSMIT THE CONFIGURED TEMPLATE USER INTERFACE COMPONENT TO THE USER DEVICE
ASSOCIATED WITH THE AT LEAST ONE USER INPUT
214

GENERATE A MULTIMEDIA COMPONENT BASED ON THE CONFIGURED TEMPLATE USER
INTERFACE COMPONENT AT THE USER DEVICE ASSOCIATED WITH THE AT LEAST ONE USER
INPUT
216

GENERATE A SHAREABLE REFERENCE TO BE ASSOCIATED WITH THE MULTIMEDIA
COMPONENT
218

TRANSMIT THE SHAREABLE REFERENCE TO AT LEAST ONE WEBSITE ASSOCIATED WITH THE
USER, WHEREIN THE USER IS ASSOCIATED WITH THE AT LEAST ONE USER INPUT
220

IDENTIFY A GENERATION DATE ASSOCIATED WITH THE MULTIMEDIA
COMPONENT
_302_

GENERATE A GENERATION DATE TAG FOR THE MULTIMEDIA COMPONENT AND
ATTACH THE GENERATION DATE TAG TO THE MULTIMEDIA COMPONENT
_304_

IDENTIFY AN EXPIRATION DATE BASED ON THE GENERATION DATE
_306_

AUTOMATICALLY DESTROY THE SHAREABLE REFERENCE AT THE EXPIRATION
DATE
_308_

GENERATE AT LEAST ONE POP-UP INDICATOR INTERFACE COMPONENT, WHEREIN THE AT LEAST ONE POP-UP INDICATOR INTERFACE COMPONENT CONFIGURES THE GRAPHICAL USER INTERFACE OF THE USER DEVICE DURING THE GENERATION OF THE MULTIMEDIA COMPONENT
402

DETERMINE A STOP TO A MULTIMEDIA CAPTURE FOR THE MULTIMEDIA COMPONENT AT THE USER DEVICE BASED ON THE CONFIGURED TEMPLATE USER INTERFACE, WHEREIN THE MULTIMEDIA CAPTURE AT THE USER DEVICE IS BASED ON A MULTIMEDIA DEVICE OPERATIVELY COUPLED TO THE USER DEVICE
602

SYSTEMS, METHODS, AND APPARATUSES FOR IMPLEMENTING A MULTIMEDIA GENERATOR IN AN ELECTRONIC NETWORK

CROSS-REFERENCE TO RELATED APPLICATIONS

This application claims the benefit of U.S. Provisional Patent Application Ser. No. 63/460,122, filed Apr. 18, 2023, entitled "SYSTEMS, METHODS, AND APPARATUSES FOR IMPLEMENTING A MULTIMEDIA GENERATOR IN AN ELECTRONIC NETWORK", the entirety of which is incorporated herein by reference.

TECHNOLOGICAL FIELD

Example embodiments of the present disclosure relate to implementing a multimedia generator in an electronic network.

BACKGROUND

Managers of electronic networks and managers of entities and organizations using electronic networks to disseminate information may have a harder time than ever accurately and efficiently tracking, approving, generating, and sharing multimedia components in an electronic network. For instance, such managers of entities and organizations may have difficulty accurately tracking the electronic process in which the multimedia component is generated-including the approval process for the generation of the multimedia component. Further, managers of such entities and organizations may have a difficult time generating the multimedia component in a streamlined manner when at least one approval user account for the multimedia component is located remotely from the user device that will generate the multimedia component. Additionally, such managers may have difficulty sharing and/or concealing the multimedia component. Thus, there exists a need for a system to accurately and efficiently track, approve, generate, and share multimedia components in an electronic network.

Applicant has identified a number of deficiencies and problems associated with implementing a multimedia generator in an electronic network. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for implementing a multimedia generator in an electronic network.

In one aspect, a system for implementing a multimedia generator is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: generate a template database; receive at least one user input comprising at least one of a selected template of the at least one pre-generated template; generate a configured template based on the received at least one user input; transmit the configured template to at least one approval user account; receive, in response to the transmission of the configured template, at least one approval indication associated with the configured template; generate a configured template user interface component to configure a graphical user interface of a user device associated with the at least one user input, wherein the user device comprises an image-capturing device; transmit the configured template user interface component to the user device associated with the at least one user input; generate a multimedia component based on the configured template user interface component at the user device associated with the at least one user input; and generate a shareable reference to be associated with the multimedia component.

In some embodiments, the at least one pre-generated template comprises at least one fillable component, and wherein the at least one user input comprises an input for the at least one fillable component.

In some embodiments, the multimedia component is a video of a user associated with the user device.

In some embodiments, the configured template is transmitted to a first approval user account and a secondary approval user account. In some embodiments, the first approval user account receives the configured template at a first time, and wherein the second approval user account receives the configured template at a second time. In some embodiments, the first approval user account and the second approval user account receive the configured template at a same time.

In some embodiments, the at least one approval indication associated with the configured template is received in a pre-determined period. In some embodiments, the pre-determined period comprises at least one of one hour, two hours, three hours, four hours, five hours, six hours, seven hours, eight hours, nine hours, ten hours, eleven hours, twelve hours, thirteen hours, fourteen hours, fifteen hours, sixteen hours, seventeen hours, eighteen hours, nineteen hours, twenty hours, twenty-one hours, twenty-two hours, twenty-three hours, or twenty-four hours.

In some embodiments, the processing device is further configured to transmit the shareable reference to at least one website associated with a user, wherein the user is associated with the at least one user input.

In some embodiments, the processing device is further configured to generate at least one pop-up indicator interface component, wherein the at least one pop-up indicator component configures the graphical user interface of the user device during the generation of the multimedia component. In some embodiments, the at least one pop-up indicator interface component configures the graphical user interface of the user device during at least one pre-determined interval.

In some embodiments, the processing device is further configured to: identify a generation date associated with the multimedia component; generate a generation date tag for the multimedia component and attach the generation date tag to the multimedia component; identify an expiration date based on the generation date; and automatically destroy the shareable reference at the expiration date. In some embodiments, the expiration date comprises a pre-determined period associated with the generate date.

In some embodiments, the processing device is further configured to: automatically, based on whether a current date meets an expiration date, transmit the shareable reference comprising the multimedia component to at least one approval account; and determine whether to automatically regenerate the shareable reference based on a response from the at least one approval account, wherein, in an instance where the at least one approval account actively denies the shareable reference, automatically destroy the shareable reference, or wherein, in an instance where the at least one approval account actively accepts or comprises no response, automatically transmit the shareable reference to at least one website.

In some embodiments, the processing device is further configured to determine a stop to a multimedia capture for the multimedia component at the user device based on the configured template user interface, wherein the multimedia capture at the user device is based on a multimedia device operatively coupled to the user device.

In another aspect, a computer program product for implementing a multimedia generator is provided. In some embodiments, the computer program product comprises at least one non-transitory computer-readable medium having computer-readable program code portions embodied therein, the computer-readable program code portions which when executed by a processing device are configured to cause the processor to: generate a template database, wherein the template database comprises at least one pre-generated template; receive at least one user input comprising at least one of a selected template of the at least one pre-generated template; generate a configured template based on the received at least one user input; transmit the configured template to at least one approval user account; receive, in response to the transmission of the configured template, at least one approval indication associated with the configured template; generate a configured template user interface component to configure a graphical user interface of a user device associated with the at least one user input, wherein the user device comprises an image-capturing device; transmit the configured template user interface component to the user device associated with the at least one user input; generate a multimedia component based on the configured template user interface component at the user device associated with the at least one user input; and generate a shareable reference to be associated with the multimedia component.

In some embodiments, the multimedia component is a video of a user associated with the user device.

In some embodiments, the configured template is transmitted to a first approval user account and a secondary approval user account.

In some embodiments, the processing device is configured to cause the processor to transmit the shareable reference to at least one website associated with a user, wherein the user is associated with the at least one user input.

In another aspect, a computer-implemented method for implementing a multimedia generator is provided. In some embodiments, the computer-implemented method may comprise: generating a template database, wherein the template database comprises at least one pre-generated template; receiving at least one user input comprising at least one of a selected template of the at least one pre-generated template; generating a configured template based on the received at least one user input; transmitting the configured template to at least one approval user account; receiving, in response to the transmission of the configured template, at least one approval indication associated with the configured template; generating a configured template user interface component to configure a graphical user interface of a user device associated with the at least one user input, wherein the user device comprises an image-capturing device; transmitting the configured template user interface component to the user device associated with the at least one user input; generating a multimedia component based on the configured template user interface component at the user device associated with the at least one user input; and generating a shareable reference to be associated with the multimedia component.

In some embodiments, the multimedia component is a video of a user associated with the user device.

In some embodiments, the configured template is transmitted to a first approval user account and a secondary approval user account.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
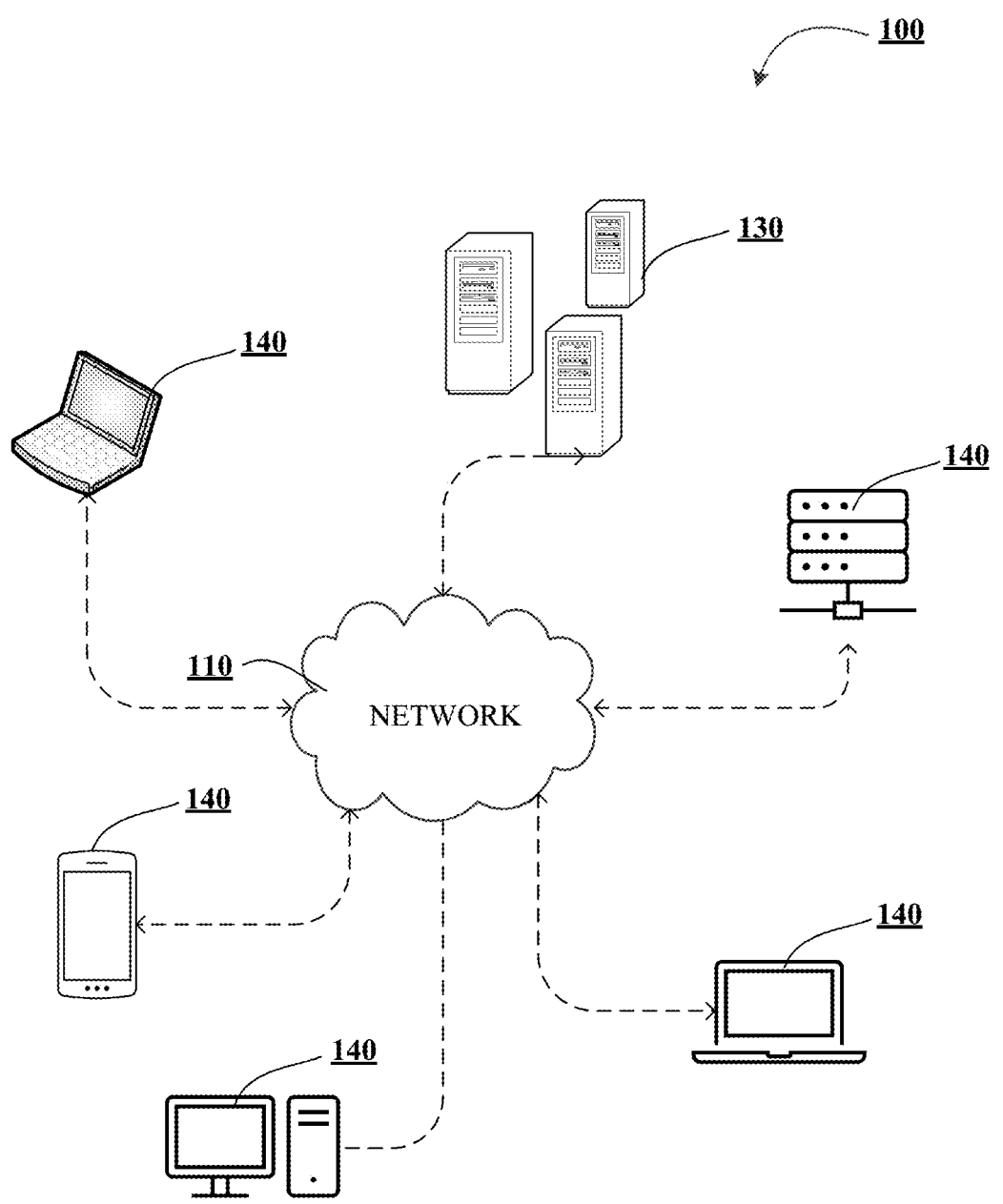
Figure 1B:
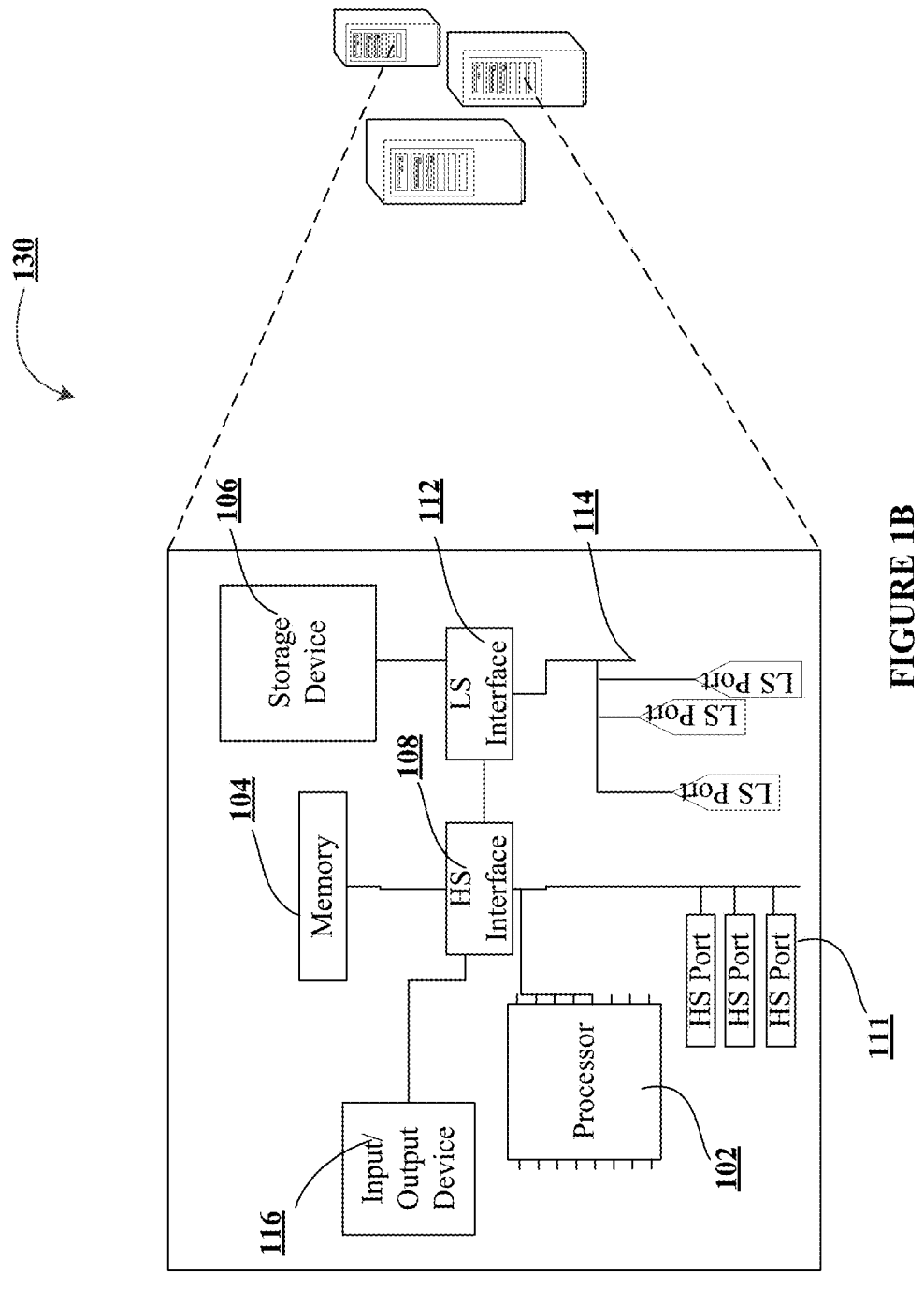
Figure 1C:
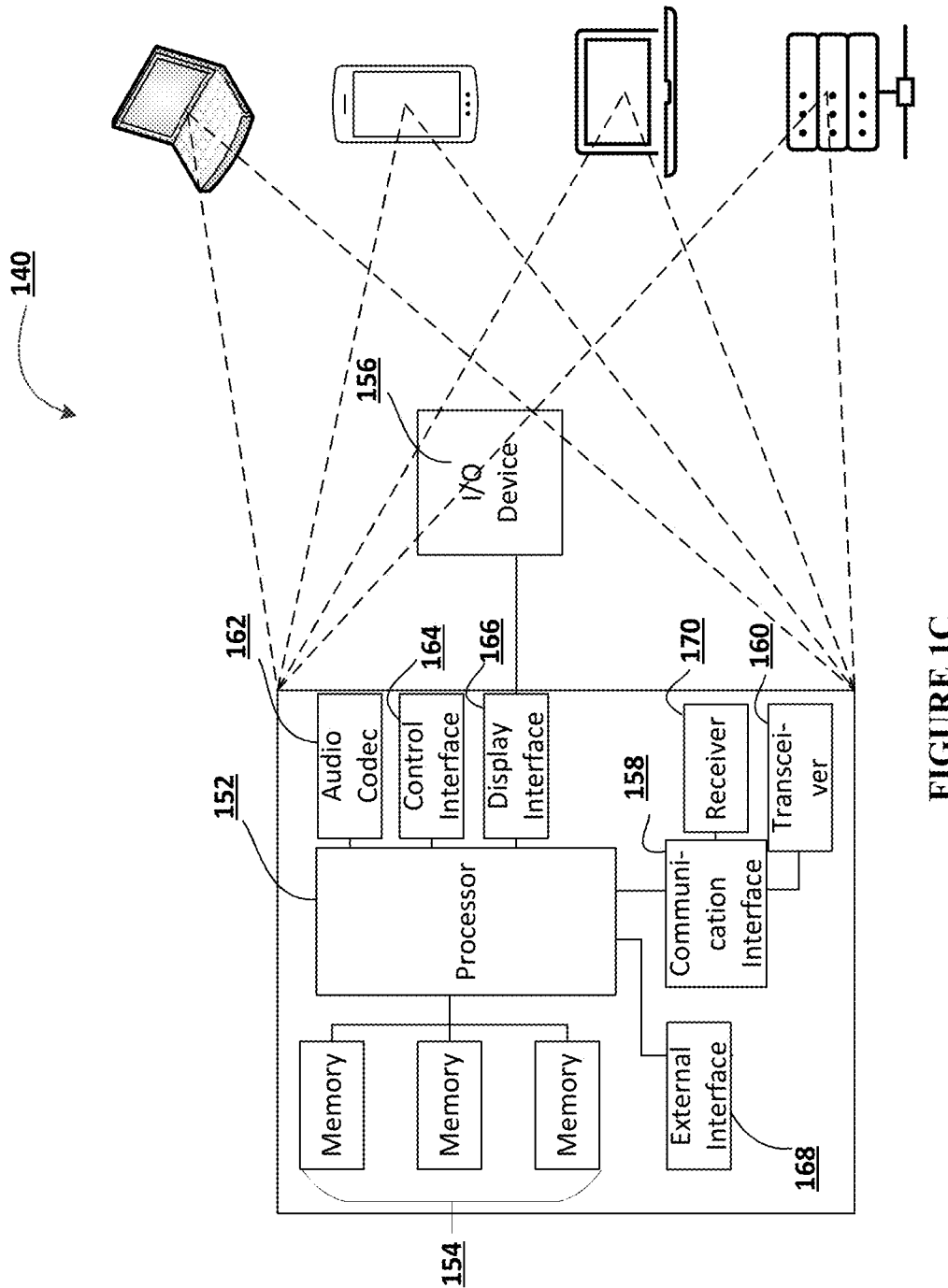
Figure 3:
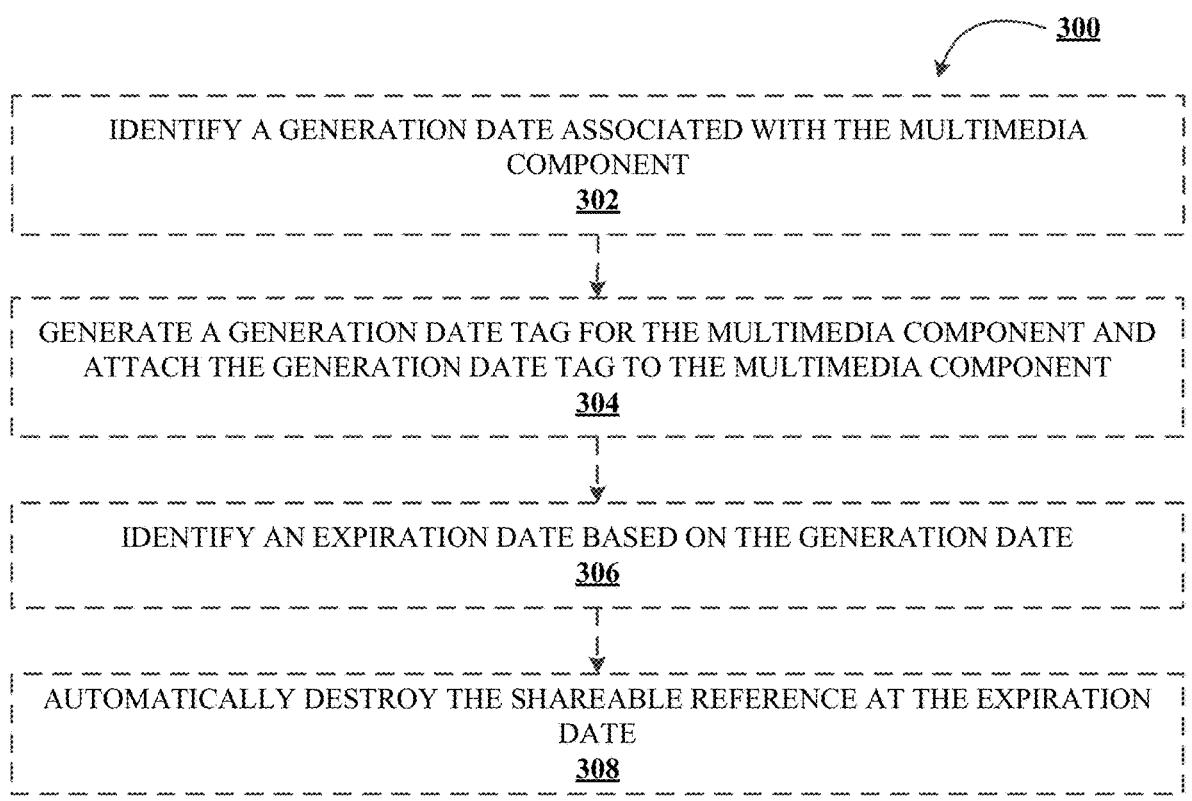
Figure 4:
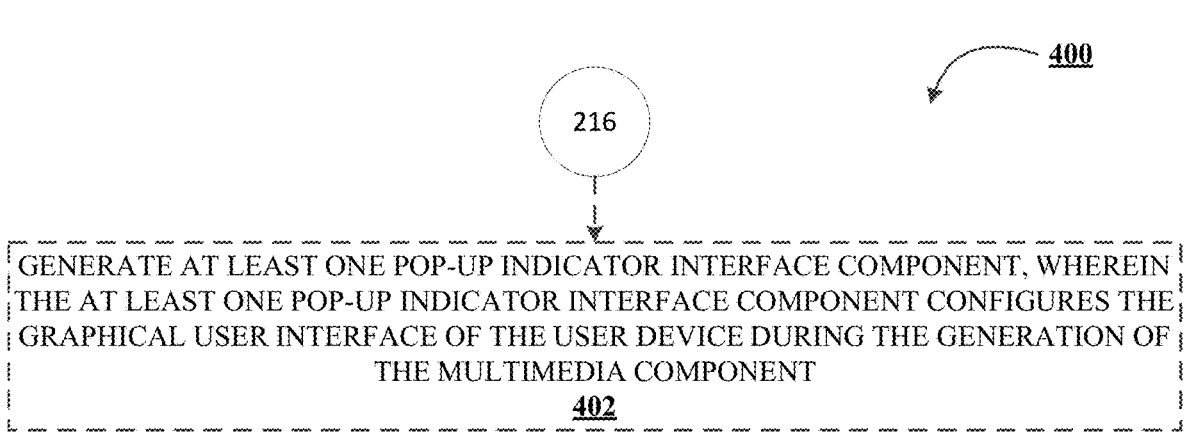
Figure 5:
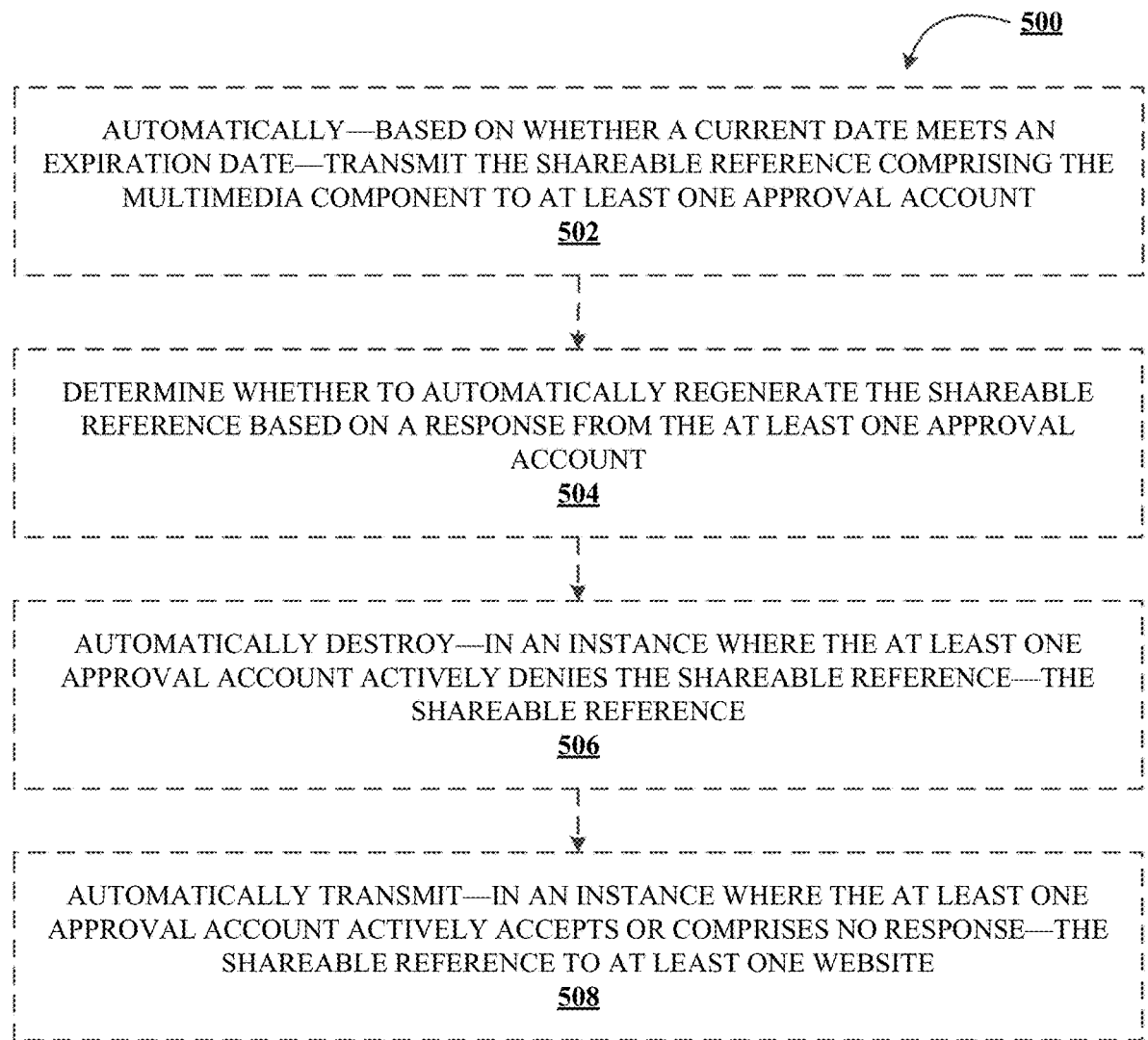
Figure 6:

FIGS. 1A-1C illustrates technical components of an exemplary distributed computing environment for implementing a multimedia generator, in accordance with an embodiment of the disclosure;

FIG. 2 illustrates a process flow for implementing a multimedia generator, in accordance with an embodiment of the disclosure;

FIG. 3 illustrates a process flow for automatically destroying the shareable reference at an expiration date, in accordance with an embodiment of the disclosure;

FIG. 4 illustrates a process flow generating at least one pop-up indicator interface component to configure the graphical user interface of the user device, in accordance with an embodiment of the disclosure;

FIG. 5 illustrates a process flow for regenerating or blocking the shareable reference after the expiration date has been met, in accordance with an embodiment of the disclosure; and FIG. 6 illustrates a process flow for determining a stop to a multimedia capture for the multimedia component based on the configured template user interface, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Managers of electronic networks and managers of entities and organizations using electronic networks to disseminate information may have a harder time than ever generating sharing multimedia components in an electronic network. For instance, such managers of entities and organizations may have difficulty accurately tracking the electronic process in which the multimedia component is generated, and generating the multimedia component in a streamlined manner when at least one approval user account for the multimedia component is located remotely from the user device. Additionally, such managers may have difficulty sharing and/or concealing the multimedia component. Thus, there exists a need for a system to accurately and efficiently tracking, approving, generating, and sharing multimedia components in an electronic network.

Accordingly, the multimedia generator system acts by generating a template database, wherein the template database comprises at least one pre-generated template comprising at least one fillable component; receiving at least one user input comprising at least one of a selected template (e.g., the user may select one of the pre-generated templates) of the at least one pre-generated template and an input for the at least one fillable component; generating a configured template (configured based on the at least one user input(s)) based on the received at least one user input; transmitting the configured template to at least one approval user account (e.g., which may be identified based on the user account, the client of the multimedia generator system, and/or the like); receiving, in response to the transmission of the configured template, at least one approval indication associated with the configured template; and generating a configured template user interface component to configure a graphical user interface of a user device associated with the at least one user input, wherein the user device comprises an image-capturing device (e.g., a camera, a microphone, and/or the like). Further, and in some embodiments, the multimedia generator system may act by transmitting the configured template user interface component to the user device associated with the at least one user input; generating a multimedia component based on the configured template user interface component at the user device associated with the at least one user input; and generating a shareable reference (e.g., a hyperlink and/or the like) to be associated with the multimedia component.

What is more, the present disclosure provides a technical solution to a technical problem. As described herein, the technical problem includes the accurate and efficient generation and sharing of at least one multimedia component. The technical solution presented herein allows for the accurate and efficiently tracking, approving, generating, and sharing multimedia components in an electronic network, in a streamlined manner and where at least one approval user associated with an approval user account is located remotely. In particular, the multimedia generator system is an improvement over existing solutions to the generation of multimedia components, (i) with fewer steps to achieve the solution, thus reducing the amount of computing resources, such as processing resources, storage resources, network resources, and/or the like, that are being used (e.g., by automatically determining the proper and appropriate user devices associated with the appropriate approval account(s) for each multimedia component, the system improves network efficiency and transmissions); (ii) providing a more accurate solution to problem, thus reducing the number of resources required to remedy any errors made due to a less accurate solution (e.g., by allowing the pre-approval of the configured template before the multimedia component is generated, the multimedia generator system provides a more accurate and efficient solution to generating multimedia components that will be approved), (iii) removing manual input and waste from the implementation of the solution, thus improving speed and efficiency of the process and conserving computing resources (e.g., by allowing the pre-approval of the configured template before the multimedia component is generated, the multimedia generator system provides a quicker solution to generating multimedia components); and (iv) determining an optimal amount of resources that need to be used to implement the solution (e.g., the optimal number of user devices based on the configured template), thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing a multimedia generator in an electronic network 100, in accordance with an embodiment of the invention. As shown in FIG. 1A, the distributed computing environment 100 contemplated herein may include a system 130 (i.e., a multimedia generator system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for implementing a multimedia generator, in accordance with an embodiment of the disclosure. In some embodiments, a system (e.g., similar to one or more of the systems described herein with respect to FIGS. 1A-1C and 2) may perform one or more of the steps of process flow 200. For example, a multimedia generator system (e.g., the system 130 described herein with respect to FIG. 1A-1C) may perform the steps of process flow 200.

As shown in block 202, the process 200 may include the step of generating a template database, wherein the template database comprises at least one pre-generated template. By way of non-limiting example, the multimedia generator system may be configured to generate a template database comprising a plurality of pre-generated templates from which a user may select and/or configure (e.g., change, fill in, and/or the like). In some embodiments, the at least one pre-generated template may comprise pre-generated templates which may be customizable, pre-generated templates which do not comprise any fillable components (e.g., may not be customizable), and/or the like. As used herein, each pre-generated template of the at least one pre-generated template(s) refers to a template and/or configurable document that comprises human-readable text. For instance, each pre-generated template may comprise prompts by which a user may read from and/or configure (change and/or fill-in to customize).

As used herein, the term "template database" refers to a library of pre-generated templates which a user may choose from, including pre-generated templates that may not be changed (e.g., pre-generated templates that do not comprise any configurable components and/or fillable components); templates that may be slightly configured (e.g., pre-generated templates that comprise a few configurable components and/or fillable components); templates that may be substantially configured (e.g., pre-generated templates that comprise a large amount (e.g., over 50% of the pre-generated template) of configurable components and/or fillable components), and/or the like. In this manner, and for the purpose of the user, the user may choose the template that best fits their needs and needed configurations (such as a pre-generated template associated with a particular topic, whereby the template database may comprise a plurality of pre-generated templates for a plurality of topics). Further, and in some embodiments, the template database may comprise pre-generated templates that are generically generated (e.g., within the overall system, the pre-generated templates are generated to work for any purpose and/or for any end-message purpose); templates generated by a particular client of the system (e.g., an entity associated with the user which may generate user-inputs and configure the pre-generated template), and/or the like. In some embodiments, the at least one pre-generated template may comprise at least one (or a plurality) of fillable components, by which a user of the system may configure and/or fill in.

In some embodiments, the template database comprises a customizable template based on at least one user input, and wherein the customizable template is transmitted automatically to at least one user device associated with at least one approval account. For example, in some such embodiments, the multimedia generator system may have fully and/or partially customizable templates that may be interacted with and updated by at least one user input to update the customizable template for the purpose of the user(s). Thus, and in some embodiments, the multimedia generator system may—based on the customized template(s)—automatically and efficiently route the customized template to at least one user devices associated with at least one approval accounts associated with the data/information within the customized template. In this manner, the multimedia generator system may determine the topic and/or purpose of the customized template (such as based on the buzz words, the sentences, and/or the like within the customized template) to determine which approval account(s) are appropriate for reviewing and approving the customized template. In some such embodiments, such a routing to the appropriate approval account(s) may comprise applying the customized template to at least one natural language processor (NLP) for processing and determining of buzz words and their associated topics.

In some embodiments, the pre-generated templates may comprise a configuration indicator component, which may indicate to the user how much of each pre-generated template is configurable (i.e., changeable and/or customizable). For instance, such an indication of how much each pre-generated template is configurable may be based on the number and/or percentage of the pre-generated document is a fillable component. Thus, and where there is a greater number and/or a greater percentage of the pre-generated document comprises fillable component(s), the greater the pre-generated document is configurable. Likewise, and where the pre-generated document comprises a lower number and/or a lower percentage of fillable components, the lesser the pre-generated document is configurable.

In some embodiments, the configuration indicator component may be shown on the user interface of the user device with the titles of pre-generated templates. For instance, the user interface of the user device for the user inputting a selection of a pre-generated template may be configured to show a title and/or identifier of each of the pre-generated templates from which the user may select and/or choose, and each of the titles of the pre-generated templates may further be associated with a configuration indicator component indicating how configurable each pre-generated template is. In some embodiments, the configuration indicator component may comprise a color feature, such that a user may quickly identify more configurable templates as compared to less configurable templates. For instance, a green configuration indicator component may indicate a template has many configurable components (i.e., many fillable components), a yellow configuration indicator component may indicate a template has a few configurable components (i.e., few fillable components), and/or a red configuration indicator component may indicate a template has zero configurable components (i.e., zero fillable components). As understood by a person of skill in the art, the colors herein described for each level of the configuration indicator are not intended to limit the potential colors of the configuration indicators but are used for explanatory and exemplary purposes only. Other such colors and indicator features may be used to indicate the configuration level of each pre-generated template.

As shown in block 204, the process flow 200 may include the step of receiving at least one user input comprising at least one of a selected template of the at least one pre-generated template. By way of non-limiting example, the at least one user input may comprise at least one of a selection of a pre-generated template from the template database. Such a selection may be based on a clicking, input from a computer component (e.g., mouse, keyboard, and/or the like), submitting a submission request for a particular pre-generated template, and/or the like. In some embodiments, and where the pre-generated template chosen comprises zero fillable components (i.e., zero configurable components), the user input may only comprise an input for the selection of the template from the template database. In some embodiments, and where the selected pre-generated template comprises at least one fillable component, the at least one user input may further comprise at least one input for the at least one fillable component.

In some embodiments, the at least one user input may further comprise at least one user input for at least one fillable component (i.e., a configurable component) of the pre-generated template, such that the template may be customized. In this manner, the at least one user input associated with at least one fillable component may comprise a keyboard clicking, such as an input of an alphanumeric character, such as letters, numbers, characters, and/or the liked. In some embodiments, the fillable components may receive at least one user input comprising a single letter, a single word, a combination of words, a paragraph, a single number, a combination of numbers, and/or the like. Further, and as described in detail above, the selected pre-generated template may comprise a plurality of fillable components, such that the user may input a plurality of user inputs for the plurality of fillable components.

As shown in block 206, the process flow 200 may include the step of generating a configured template based on the received at least one user input. By way of non-limiting example, the generation of the configured template may comprise the selected pre-generated template after each of the at least one user inputs have been received for the at least one fillable component(s). Thus, and as used herein, the configured template may refer the finalized version of the pre-generated template after each of the intended user inputs have been received. For instance, and where the pre-generated template does not comprise any fillable components, the configured template may comprise the selected pre-generated template. However, and where the pre-generated template comprises a plurality of fillable components, the configured template may comprise the selected pre-generated template and each of the user inputs that have been received for the plurality of fillable components. In some embodiments, the configured template may comprise the user inputs for only certain fillable components, while at least one of the fillable components may remain blank and/or not filled in due to the user not inputting data for the at least one fillable component. In this manner, the user may not be required to input data for each of the fillable components of the pre-generated template in order for a configured template to be generated.

In some embodiments, the configured template may only be generated after the at least one user input is received (e.g., for the selection of the pre-generated template and/or for the fillable component(s)) and a submission request is submitted (e.g., based on a user submit button). For instance, the graphical user interface of the user device associated with the user inputting the user inputs may comprise a submission component (e.g., a selectable component on the GUI for submitting a request to submit the user input(s)), whereby the submission component may require the user to select the submission component for the configured template to be generated.

As shown in block 208, the process flow 200 may include the step of transmitting the configured template to at least one approval user account. By way of non-limiting example, the transmission of the configured template may comprise transmitting a data packet comprising the configured template to a secondary user account, such as an approval user account and/or a plurality of approval user accounts. In some embodiments, the at least one approval user account may be associated with a user that has been identified as a necessary approval for the configured template before a multimedia component can be generated based on the configured template. For instance, and where an entity and/or organization is a client of the multimedia generator system, the entity and/or organization may require certain approvals before a multimedia component (e.g., a video discussing details regarding company policies, suggested courses of actions for individuals who may be clients of the entity/organization, and/or the like) can be published. Thus, and in those embodiments, the multimedia generator system may identify the approval user account(s) necessary for the client of the multimedia generator system and/or identify the approval user accounts necessary based on the category of multimedia (e.g., what is discussed and/or disclosed in the multimedia component), and the multimedia generator system may automatically transmit the configured template to the identified approval user account(s). In some embodiments, each approval user account may be associated with a particular user device, such as a mobile, a desktop, a tablet, a laptop, and/or the like, and the multimedia generator system may transmit the configured template(s) to the at least one approval user device(s).

In some embodiments, the configured template may be transmitted to a single approval user account, a plurality of approval user accounts, and/or the like, whereby the approval user account(s) are determined by a manager of the system, a client of the system, and/or the like. For instance, the approval user account(s) identified for a configured template may be identified within the system, by the client, such that—based on the configured template, the category of the configured template, the user associated with the configured template, and/or the like—at least one approval user account may be identified. Thus, the system may be configured by a client of the system, such that the approval user account(s) may be dynamically changed and/or updated.

In some embodiments, the configured template may be transmitted to a plurality of approval accounts and a plurality of user devices associated with the user approval accounts. For instance, and in some embodiments, the configured template may be transmitted to first approval user account and a second approval user account. For instance, and in some embodiments, the configured template may be transmitted to the first approval user account and second approval user account at a first time and a second time, respectively. In some embodiments, the configured template may be transmitted to the first approval user account and second approval user account at the same time, such that the first approval user account and the second user approval account can review and approve in parallel. In some embodiments, the approval device(s) may comprise a computer, tablet, mobile device, and/or the like which may be connected to the multimedia generator system via an open network, a closed network, and/or the like.

As shown in block 210, the process flow 200 may include the step of receiving—in response to the transmission of the configured template—at least one approval indication associated with the configured template. By way of non-limiting example, the multimedia generator system may receive from at least one approval user account (i.e., the approval user accounts that originally were received the configured template) a response indicating an approval of the configured template or a disapproval of the configured template. In some embodiments, such an approval and/or disapproval may be based on current entity policies, on current regulations and associated compliance requirements, and/or the like.

In some embodiments, the at least one approval indication associated with the configured template may be received in a pre-determined period, which may be based on a time period by which the approval(s) must be received in order for the multimedia component to be published within by a particular deadline (e.g., 24 hours). In some embodiments, the pre-determined period may comprise at least one of one hour, two hours, three hours, four hours, five hours, six hours, seven hours, eight hours, nine hours, ten hours, eleven hours, twelve hours, thirteen hours, fourteen hours, fifteen hours, sixteen hours, seventeen hours, eighteen hours, nineteen hours, twenty hours, twenty-one hours, twenty-two hours, twenty-three hours, and/or twenty-four hours.

As shown in block 212, the process flow 200 may include the step of generating a configured template user interface component to configure a graphical user interface of a user device associated with at least one user input, wherein the user device comprises an image-capturing device. As used herein, the term "image-capturing device" may refer to at least one of a camera (e.g., a digital camera), a sensor configured to generate an image, a data processing module configured to generate an image based on data received, scanning devices, sound recording components (e.g., microphone(s) and/or speaker(s)), and/or the like. As used herein, and by way of non-limiting example, a digital camera is described herein for capturing the data used in generating the multimedia component. However, and as a person of skill in the art will understand, any similar image-capturing device may be used in place of the digital camera described herein. In some embodiments, the user device (e.g., the user device associated with the user account that generated the user input(s)) may comprises an image-capturing device.

In some embodiments, the configured template user interface component may comprise a data packet to configure the intended recipient user device (e.g., a user device associated with the user that submitted the user input which configured the pre-generated template), whereby the data packet comprises computer code to configure the graphical user interface (GUI) of the intended user device. For instance, the user device's GUI may be configured to show the configured template after the configured template has been approved by the at least one user account. In some embodiments, and where there are multiple approval user accounts required for final approval of the configured template, only after all approvals are received from each of the user approval accounts for the configured template.

As shown in block 214, the process flow 200 may include the step of transmitting the configured template user interface component to the user device associated with the at least one user input. By way of non-limiting example, the multimedia generator system may transmit the configured template user interface component (e.g., a data packet comprising the configured template which is configured to be shown on a GUI) to the user device (e.g., the user device associated with the user account that generated the user input(s)) to configure the GUI of the user device. Thus, and in this manner, the user device's GUI may be configured to show the user of the user device the approved configured template, such that the configured template may be read and understood by the user. In some embodiments, the multimedia generator system may configure the GUI of the user device to allow the user to read from the configured template during the generation of the multimedia component, which is described in further detail below.

As shown in block 216, the process flow 200 may include the step of generating a multimedia component based on the configured template user interface component at the user device associated with the at least one user input. In some embodiments, the multimedia component may comprise a video, an image, a closed captioning, a write-up of the video, a write-up of the closed captioning, and/or the like. In some embodiments, the multimedia component may be generated by the image-capturing device collecting the image data of the multimedia component (e.g., image data, sound data, and/or the like) and generating a data packet of the image data concatenated with the sound data, just the sound data, just the image data, and/or the like, to create the multimedia component. In some embodiments, the system may capture and/or generate a plurality of multimedia components for a user to select from for transmission to an approval account(s).

In some embodiments, and once the multimedia component has been generated, the system may be configured to transmit the multimedia component to at least one approval user account for a final and/or secondary approval. In some embodiments, and as previously described above, a manager of the system, a client of the system, and/or the like, may identify the at least one approval user account which should be associated with the multimedia component, whereby the identified at least one approval user account may approve and/or disapprove of the multimedia component before the multimedia component is published and/or shared.

Further, and in some embodiments, the user device associated with the user may be configured to stop recording and/or capturing an image of the user once the configured template has been completed (e.g., once the configured template has been read through). In some embodiments, and where a pre-determined period is set for the multimedia component, the user device may be configured to stop recording and/or stop capturing an image at the time the pre-determined period is met.

Additionally, and in some embodiments, the multimedia generator system may allow and/or require a plurality of multimedia components to be generated based on the same configured template. In this manner, and based on the following processes described herein, the plurality of multimedia components (such as three and/or a multitude of multimedia components) may be transmitted to the at least one approval account(s) for selection. Alternatively, and/or additionally, the user associated with the generation of the multimedia component (e.g., the user captured by the image-capturing device) may view the plurality of multimedia components and select which multimedia component to continue with the below processes.

In some embodiments, and during the process of generating the multimedia component, the user associated with generating the multimedia component (e.g., the user captured by the image-capturing device) may add extra multimedia materials (such as music, video clips, images, music, and/or the like) to the multimedia component. In this manner, and in some embodiments, the extra multimedia materials may be overlayed on the multimedia component partially and/or wholly at particular time stamps of the multimedia component. In some embodiments, the extra multimedia materials may be identified by the multimedia generator system itself as suggestions to the user of the multimedia component. In some embodiments, a database and/or library of extra multimedia materials may be interacted with by a user of the multimedia component, whereby the user may access the database and/or library by submitting a request from the user device to the multimedia generator system (which may store the database and/or library) to access the database and/or library over a network.

As shown in block 218, the process flow 200 may include the step of generating a shareable reference to be associated with the multimedia component. In some embodiments, the multimedia component may comprise a video of the user associated with the user device, whereby the multimedia generator system may generate the multimedia component to comprise a video of the user as the user reads from the approved configured template.

As used herein, the term "shareable reference" may comprise a hyperlink, a link, a title which may be identifiable within a particular industry/category, a title which may be entirely unique, an identifier which may be used within a database, and/or the like. In this manner, the shareable reference may be used to identify and access the multimedia component by other users besides the user associated with the user input (e.g., the user that was captured during the generation of the multimedia component).

In some embodiments, the multimedia component may be associated with a shareable reference, such that the multimedia component may be identified, accessed, and/or the like. In some embodiments, the shareable reference may be tagged with the multimedia component (e.g., stored with the multimedia component), linked to the storage location of a multimedia component (e.g., a particular database, a particular website showing the multimedia component, and/or the like.

In some embodiments, and as shown in block 220, the process flow 200 may include the step of transmitting the shareable reference to at least one website associated with the user, wherein the user is associated with the at least one user input. In some embodiments, the shareable reference may be transmitted to a website, such as a social media website, an entity/organization website, a video-sharing website, a career-centric website, and/or the like. In some embodiments, the shareable reference may be uploaded and/or input into a website, like the websites described above.

In some embodiments, the multimedia component may be stored in a write-once read many (WORM) compliance archive, whereby the multimedia component may be available for accessing without allowing a configuration of the multimedia component and its associated data. For instance, such a WORM compliance archive may comprise a plurality of multimedia components, which may be accessed based on the shareable reference, whereby the multimedia component(s) is generated at a first time (e.g., such as that described above with respect to FIG. 2) and shared at least once as a read-only file.

FIG. 3 illustrates a process flow 300 for automatically destroying the shareable reference at an expiration date, in accordance with an embodiment of the disclosure. In some embodiments, a system (e.g., similar to one or more of the systems described herein with respect to FIGS. 1A-1C and 2) may perform one or more of the steps of process flow 300. For example, a multimedia generator system (e.g., the system 130 described herein with respect to FIG. 1A-1C) may perform the steps of process flow 300.

As shown in block 302, the process flow 300 may include the step of identifying a generation date associated with the multimedia component. In some embodiments, the multimedia generator system may identify the generation date as the date the multimedia component was created and/or generated within the multimedia generator system. In some embodiments, the generation date may be updated when the multimedia component is updated, such that generation date comprises the most-recent update date to the multimedia component.

As shown in block 304, the process flow 300 may include the step of generating a generation date tag for the multimedia component and attaching the generation date tag to the multimedia component. In some embodiments, the generation date associated with the multimedia component may be used to generate a generation date tag, which in some embodiments may be attached to the multimedia component (e.g., stored in the data packet of the multimedia component). In some embodiments and based on this attachment of the generation date tag to the multimedia component may be used by the multimedia generator system to determine whether the multimedia component is still valid (e.g., an expiration has not occurred) and should still be published and/or accessed.

As shown in block 306, the process flow 300 may include the step of identifying an expiration date based on the generation date. In some embodiments, the multimedia generator system may identify a particular expiration date for the multimedia component based on the generation date, such as a year from the generation date, six months from the generation date, one month from the generation date, and/or the like. Thus, and in some embodiments, a pre-determined period for the expiration date of the multimedia component may be determined by the multimedia generator system itself, by a client of the multimedia generator system (e.g., an organization/entity), and/or the like. Thus, and in some embodiments, the expiration date may comprise a pre-determined period (e.g., a month, two months, three months, four months, five months, six months, seven months, eight months, nine months, ten months, eleven months, twelve months, and/or the like) associated with the generation date (i.e., a pre-determined period from the generation date), by which the system may automatically destroy the shareable reference.

In some embodiments, and similar to the generation date tag attached to the multimedia component, the multimedia generator system may also generate and attach an expiration date tag based on the identified expiration date. Thus, and in some embodiments, once the expiration date of the expiration date tag is met, the multimedia component may be disallowed access by viewers, destroyed, and/or the like.

As shown in block 308, the process flow 300 may include the step of automatically destroying the shareable reference at the expiration date. In some embodiments, the multimedia generator system may automatically destroy and/or disallow access to the multimedia component at the expiration date. For instance, and where the multimedia component is associated with a shareable reference that allows access to the multimedia component, the multimedia generator system may destroy, unlink, and/or the like, the shareable reference once the expiration date is met at a current time.

FIG. 4 illustrates a process flow 400 for generating at least one pop-up indicator interface component to configure the graphical user interface of the user device, in accordance with an embodiment of the disclosure. In some embodiments, a system (e.g., similar to one or more of the systems described herein with respect to FIGS. 1A-1C and 2) may perform one or more of the steps of process flow 400. For example, a multimedia generator system (e.g., the system 130 described herein with respect to FIG. 1A-1C) may perform the steps of process flow 400.

In some embodiments, and as shown in block 402, the process flow 400 may include the step of generating at least one pop-up indicator interface component, wherein the at least one pop-up indicator interface component configures the graphical user interface of the user device during the generation of the multimedia component. In some embodiments, the process described in block 402 may immediately follow the process described in block 216 of FIG. 2 and/or may occur in parallel to the process described in block 216 of FIG. 2. By way of non-limiting example, the multimedia generator system may generate a pop-up indicator to configure a GUI of the user device (e.g., the user device associated with the user of the user input(s)), which may comprise an indicator to the user viewing the GUI to perform an action. For instance, a pop-up indicator may comprise text and/or characters which may indicate to the user to look at the image-capturing device, to smile, to improve posture, to not speak with the user's hands (e.g., to not over-gesture), and/or the like. In some embodiments, the pop-up indicator interface component may configure the graphical user interface of the user device for at least one pre-determined interval, such as an interval of thirty seconds, one minute, two minutes, three minutes, four minutes, five minutes, six minutes, seven minutes, eight minutes, nine minutes, ten minutes, and/or the like, such that the popindicator interface component configures the GUI of the user device at each pre-determined interval period.

In some embodiments, the pop-up indicator interface component may configure the GUI of the user device based on facial recognition data of the image-capturing device. For instance, the image-capturing device may be associated with a processor configured to determine certain physical characteristics of the user as the user is captured by the image-capturing device. For example, the multimedia generator system may be configured to determine when the user is not performing an action (e.g., smiling and/or the like) and/or not perform an action (e.g., gesture) based on the facial recognition system, where the pop-up interface indicator component may configure the GUI to request the user to perform or not perform the action.

FIG. 5 illustrates a process flow 500 for regenerating or blocking the shareable reference after the expiration date has been met, in accordance with an embodiment of the disclosure. In some embodiments, a system (e.g., similar to one or more of the systems described herein with respect to FIGS. 1A-IC and 2) may perform one or more of the steps of process flow 500. For example, a multimedia generator system (e.g., the system 130 described herein with respect to FIG. 1A-1C) may perform the steps of process flow 500.

In some embodiments, and as shown in block 502, process flow 500 may include the step of automatically—based on whether a current date meets an expiration date—transmitting the shareable reference comprising the multimedia component to at least one approval account. For example, the multimedia generator system may determine whether an expiration date (such as the expiration date described above with respect to FIG. 3) has been met by a current date, whereby the current date is the date currently or instantly identified based on date, time, geographical location, and/or the like. As discussed above, the expiration date may comprise a particular timestamp for expiration (e.g., down to the hour, minute of a day within a month within a year, and/or the like) or just a specific date (e.g., month, day, and year) the multimedia component will expire. However, and in some embodiments, an approval account associated with the multimedia component may be contacted (e.g., by the multimedia generator system over a network to a user device associated with the at least one approval account) to re-verify the previously generated multimedia component and the associated shareable reference. Such a process is described below, whereby the contact to the at least one approval account may comprise a request for a response or a non-response by the approval account.

In some embodiments, and as shown in block 504, the process flow 500 may include the step of determining whether to automatically regenerate the shareable reference based on a response from the at least one approval account. For example, the multimedia generator system may determine whether to automatically regenerate the shareable reference comprising the multimedia component, such that the shareable reference is still live and shareable with the multimedia component. In this manner, the at least one approval account may be identified as a security measure, a quality control measure, and/or the like for verifying the multimedia component and/or the shareable reference itself after the expiration date has been met or has passed. In such embodiments, the systems may automatically identify the at least one approval account based on a current data of the multimedia component (such as users that are identified within a database as being familiar with the pre-generated template of the multimedia component and/or based on identifying approval account(s) associated with similar multimedia components and their data in an instance where the template used to generate the multimedia component is customizable). In some embodiments, the multimedia generator system may determine similar multimedia components based on a natural language processor (NLP) being applied to historical multimedia components and the current multimedia component. In some embodiments, the at least one approval account may be automatically identified based on previous approvals received for the multimedia component (e.g., such as the approval account(s) needed for the first publication of the multimedia component at the shareable reference), whereby the previous approval accounts may comprise all or some of the same approval accounts identified for the original publication of the multimedia component, such as the user account(s) associated with the user input(s) of block 214.

In some embodiments, the multimedia generator system may also re-verify the underlying multimedia component without re-verifying the shareable reference for the multimedia component (e.g., where the shareable component or website associated with shareable component is no longer appropriate to house, store, and/or present the multimedia component). For example, an approval account may make individual and/or a combination of changes or revisions to the multimedia component itself (such as deleting images, deleting interface components, deleting graphics, deleting sound, or making changes/additions thereof, to the multimedia component) without completely regenerating the multimedia component. In some embodiments, such a shareable reference and its associated website may be determined to be inappropriate for the multimedia component based on its operating system, version of operating system, security protocols, and/or the like.

In some embodiments, and as shown in block 506, the process flow 500 may include the step of automatically destroying—in an instance where the at least one approval account actively denies the shareable reference—the shareable reference. For example, and in some embodiments, the multimedia generator system may transmit a request for a response to a user device associated with the at least approval account (such as the approval account(s) and their user devices described above with respect to blocks 502-504) and configure the GUI of the user device to request user input to re-verify the shareable reference and/or the multimedia component. Additionally, the multimedia generator system may receive a response from the user device associated with the approval account(s), based on the user device receiving the response at the GUI (e.g., based on a user/approval account user selecting a selectable icon on the GUI such as an acceptance, denial, and/or the like) and transmitting the response from the user device(s) back to the system over a network, such as the network shown and described with respect to FIG. 1A. In some such embodiments, the response from the user device(s) may comprise an express denial of the shareable reference and/or the multimedia component for re-generation after the expiration date. Based on receiving this denial response, the multimedia generator system may automatically destroy the shareable reference and/or the underlying multimedia component in a similar manner as that described above with respect to FIG. 3.

In some embodiments, and as shown in block 508, the process flow 500 may include the step of automatically transmitting—in an instance where the at least one approval account actively accepts or comprises no response—the shareable reference to at least one website. For example, and in some embodiments, the multimedia generator system may receive a response from the user device(s) associated with the approval account(s) which comprises an acceptance or comprises no response (e.g., an absence of a response for the transmitted request for response by the multimedia generator system) which may be understood by the multimedia generator system to be an acceptance of the shareable reference and/or the multimedia component to be reshared or published past the previous expiration date.

In some embodiments, and upon the regeneration of the shareable reference and/or the multimedia component, the multimedia generator system may restart the expiration date from the regeneration date of the shareable reference/multimedia component. In this manner, the shareable reference and/or the multimedia component may be periodically reverified and regenerated by an approval account(s) (such as for reverifying the underlying information of the multimedia component, the operating system of the shareable reference's host website, and/or the like).

FIG. 6 illustrates a process flow 600 for determining a stop to a multimedia capture for the multimedia component based on the configured template user interface, in accordance with an embodiment of the disclosure. In some embodiments, a system (e.g., similar to one or more of the systems described herein with respect to FIGS. 1A-1C and 2) may perform one or more of the steps of process flow 600. For example, a multimedia generator system (e.g., the system 130 described herein with respect to FIG. 1A-1C) may perform the steps of process flow 600.

In some embodiments, and as shown in block 602, the process flow 600 may include the step of determining a stop to a multimedia capture for the multimedia component at the user device based on the configured template user interface, wherein the multimedia capture at the user device is based on a multimedia device operatively coupled to the user device. For example, and in some embodiments, the multimedia generator system may determine a stop to a multimedia capture (e.g., such as a stop trigger for the image-capturing device for a video if the video is the multimedia component) for the multimedia component based on a configured template user interface, in an instance where the configured template user interface shows that the configured template has reached its end. Thus, and where the configured template comprises a plurality of lines, sentences, paragraphs, and/or the like, the multimedia generator system may determine at which point the user captured by the image-capturing device has reached the end (or last line, last sentence, and/or the like) of the configured template in the multimedia component, and based on this determined end will transmit a trigger to the image-capturing device to stop recording. In some embodiments, the trigger for stopping the multimedia capture at the image-capturing device may be delayed by a pre-determined period, such as a few seconds, a multiple seconds, and/or the like. In some such embodiments, the pre-determined period may be pre-determined and input by a client of the multimedia generator system, by the multimedia generator system itself (such as based on previous multimedia components and their stop triggers input by a user recorded by the image-capturing device), by a manager of the multimedia generator system, and/or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for implementing a multimedia generator, the system comprising:

a memory device with computer-readable program code stored thereon;

at least one processing device operatively coupled to the at least one memory device and the at least one communication device, wherein executing the computer-readable code is configured to cause the at least one processing device to:

generate a template database, wherein the template database comprises at least one pre-generated template;

receive at least one user input comprising at least one of a selected template of the at least one pre-generated template;

generate a configured template based on the received at least one user input;

transmit the configured template to at least one approval user account;

receive, in response to the transmission of the configured template, at least one approval indication associated with the configured template;

generate a configured template user interface component to configure a graphical user interface of a user device associated with the at least one user input, wherein the user device comprises an image-capturing device;

transmit the configured template user interface component to the user device associated with the at least one user input;

generate a multimedia component using a multimedia capture device associated with the user device and based on the configured template user interface component at the user device associated with the at least one user input, wherein the multimedia capture device captures at least one of an audio or visual input at the user device;

automatically stop the capture of the multimedia component based on the configured template user interface reaching an end, wherein the end of the configured template user interface is determined based on the multimedia capture device capturing a last statement of the configured template; and generate a shareable reference to be associated with the multimedia component.

2. The system of claim 1, wherein the at least one pre-generated template comprises at least one fillable component, and wherein the at least one user input comprises an input for the at least one fillable component.

3. The system of claim 1, wherein the configured template is transmitted to a first approval user account and a secondary approval user account.

4. The system of claim 3, wherein the first approval user account and the second approval user account receive the configured template at a same time.

5. The system of claim 1, wherein the at least one approval indication associated with the configured template is received in a pre-determined period.

6. The system of claim 1, wherein the processing device is further configured to:

transmit the shareable reference to at least one website associated with a user, wherein the user is associated with the at least one user input.

7. The system of claim 1, wherein the processing device is further configured to:

generate at least one pop-up indicator interface component, wherein the at least one pop-up indicator component configures the graphical user interface of the user device during the generation of the multimedia component.

8. The system of claim 7, wherein the at least one pop-up indicator interface component configures the graphical user interface of the user device during at least one pre-determined interval.

9. The system of claim 1, wherein the processing device is further configured to:

identify a generation date associated with the multimedia component;

generate a generation date tag for the multimedia component and attach the generation date tag to the multimedia component;

identify an expiration date based on the generation date; and automatically destroy the shareable reference at the expiration date.

10. The system of claim 9, wherein the processing device is further configured to:

automatically, based on whether a current date meets an expiration date, transmit the shareable reference comprising the multimedia component to at least one approval account; and determine whether to automatically regenerate the shareable reference based on a response from the at least one approval account, wherein, in an instance where the at least one approval account actively denies the shareable reference, automatically destroy the shareable reference, or wherein, in an instance where the at least one approval account actively accepts or comprises no response, automatically transmit the shareable reference to at least one website.

11. The system of claim 9, wherein the expiration date comprises a pre-determined period associated with the generation date.

12. The system of claim 1, wherein the at least template database comprises a customizable template based on at least one user input, and wherein the customizable template is transmitted automatically to at least one user device associated with at least one approval account.

13. A computer program product for implementing a multimedia generator, wherein the computer program product comprises at least one non-transitory computer-readable medium having computer-readable program code portions embodied therein, the computer-readable program code portions which when executed by a processing device are configured to cause the processor to:

generate a template database, wherein the template database comprises at least one pre-generated template;

receive at least one user input comprising at least one of a selected template of the at least one pre-generated template and;

generate a configured template based on the received at least one user input;

transmit the configured template to at least one approval user account;

receive, in response to the transmission of the configured template, at least one approval indication associated with the configured template;

generate a configured template user interface component to configure a graphical user interface of a user device associated with the at least one user input, wherein the user device comprises an image-capturing device;

transmit the configured template user interface component to the user device associated with the at least one user input;

generate a multimedia component using a multimedia capture device associated with the user device and based on the configured template user interface component at the user device associated with the at least one user input, wherein the multimedia capture device captures at least one of an audio or visual input at the user device;

automatically stop the capture of the multimedia component based on the configured template user interface reaching an end, wherein the end of the configured template user interface is determined based on the multimedia capture device capturing a last statement of the configured template; and generate a shareable reference to be associated with the multimedia component.

14. The computer program product of claim 13, wherein the multimedia component is a video of a user associated with the user device.

15. The computer program product of claim 13, wherein the configured template is transmitted to a first approval user account and a secondary approval user account.

16. The computer program product of claim 13, wherein the processing device is configured to cause the processor to:

transmit the shareable reference to at least one website associated with a user, wherein the user is associated with the at least one user input.

17. A computer-implemented method for implementing a multimedia generator, the computer-implemented method comprising:

generating a template database, wherein the template database comprises at least one pre-generated template;

receiving at least one user input comprising at least one of a selected template of the at least one pre-generated template;

generating a configured template based on the received at least one user input;

transmitting the configured template to at least one approval user account;

receiving, in response to the transmission of the configured template, at least one approval indication associated with the configured template;

generating a configured template user interface component to configure a graphical user interface of a user device associated with the at least one user input, wherein the user device comprises an image-capturing device;

transmitting the configured template user interface component to the user device associated with the at least one user input;

generating a multimedia component using a multimedia capture device associated with the user device and based on the configured template user interface component at the user device associated with the at least one user input, wherein the multimedia capture device captures at least one of an audio or visual input at the user device; and automatically stopping the capture of the multimedia component based on the configured template user interface reaching an end, wherein the end of the configured template user interface is determined based on the multimedia capture device capturing a last statement of the configured template; and generating a shareable reference to be associated with the multimedia component.

18. The computer-implemented method of claim 16, wherein the multimedia component is a video of a user associated with the user device.

19. The computer-implemented method of claim 16, wherein the configured template is transmitted to a first approval user account and a secondary approval user account.

* * * * *